July 30, 1940.                E. C. KIEKHAEFER                2,209,776
MAGNETIC CLUTCH CONSTRUCTION
Filed Nov. 26, 1937                3 Sheets-Sheet 2
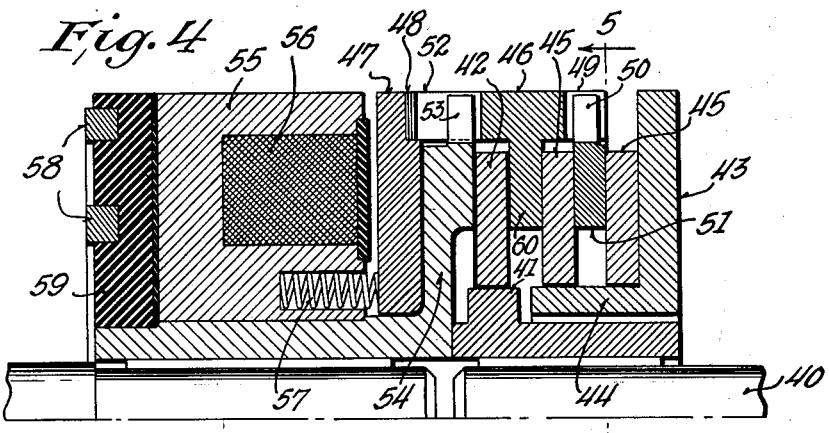
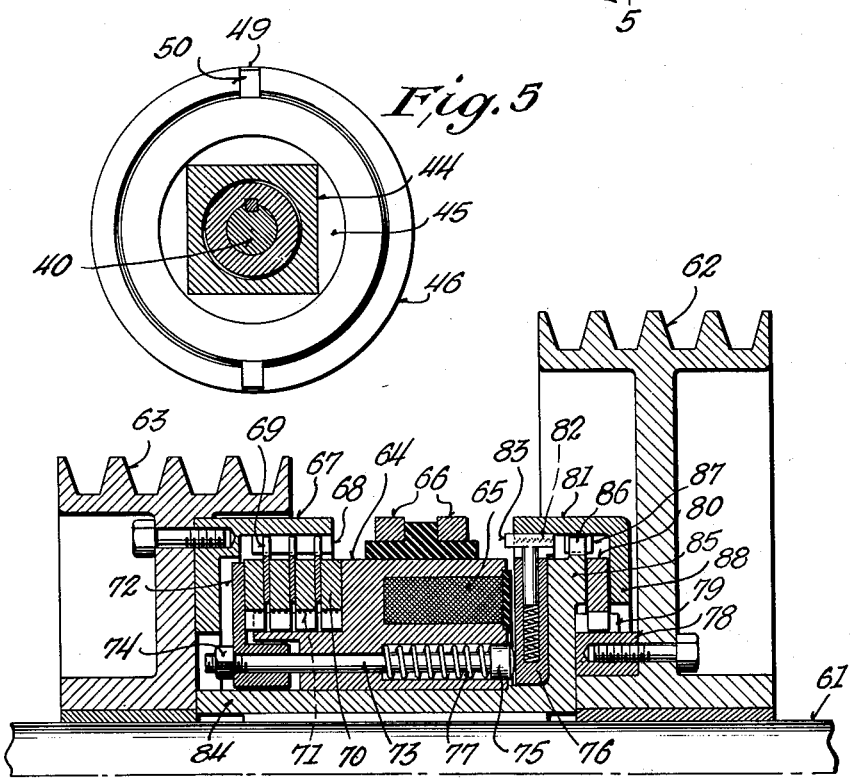
INVENTOR.
ELMER C. KIEKHAEFER
BY
ATTORNEY.

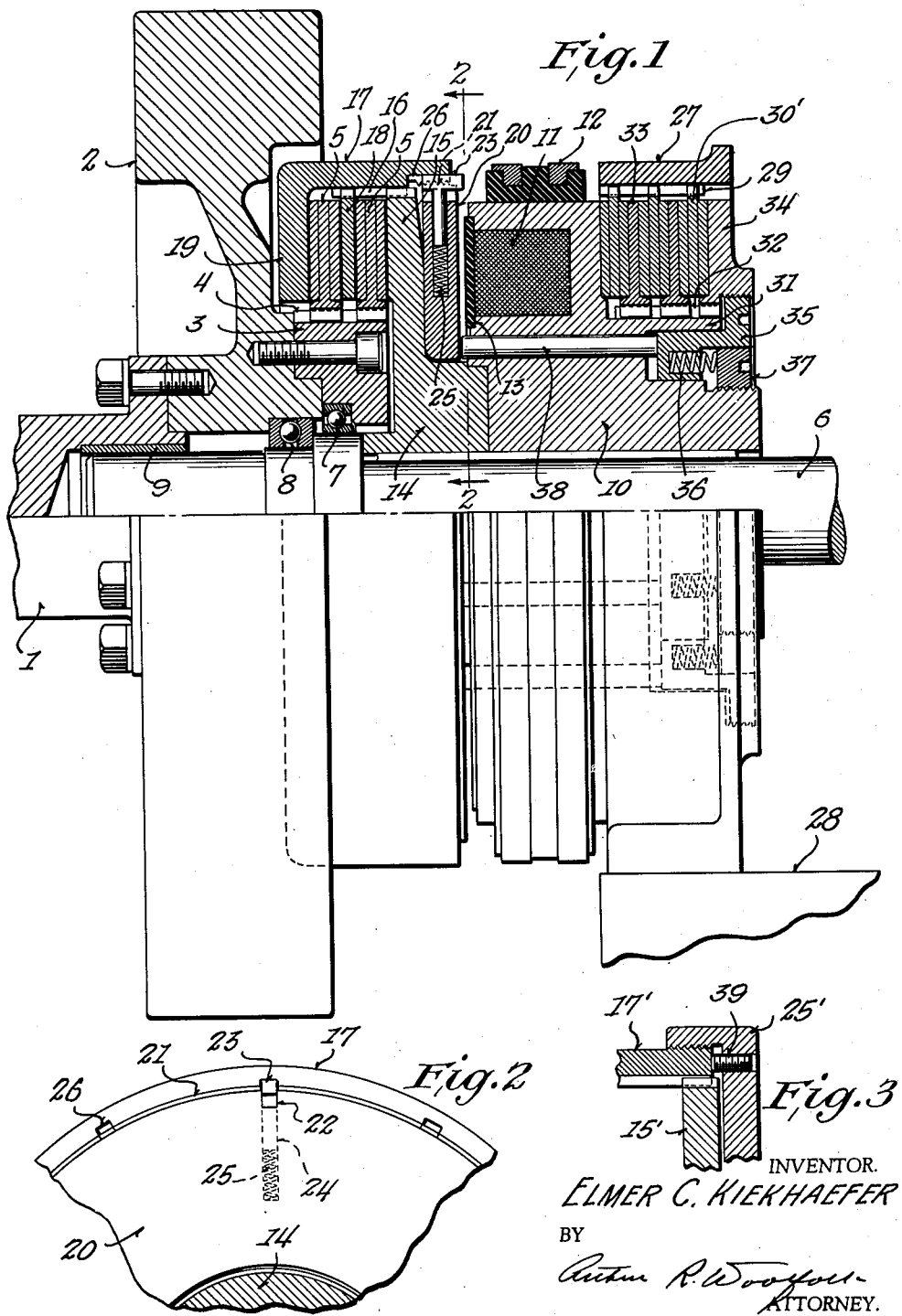

July 30, 1940.  E. C. KIEKHAEFER  2,209,776
MAGNETIC CLUTCH CONSTRUCTION
Filed Nov. 26, 1937  3 Sheets-Sheet 3
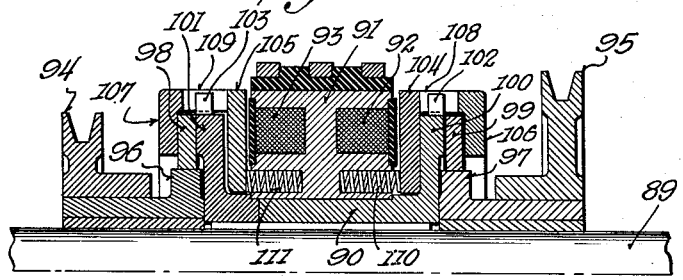
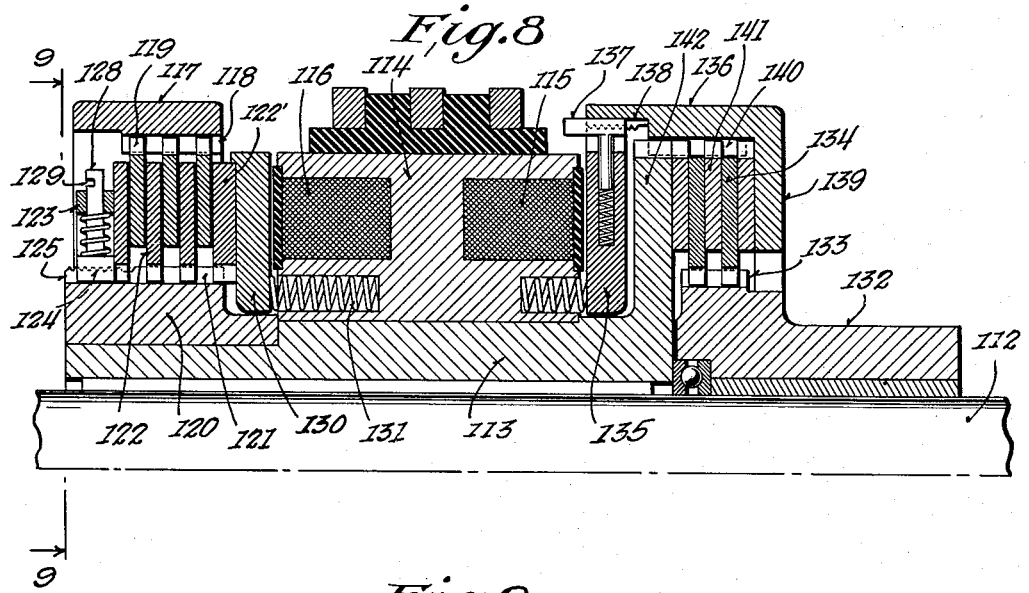
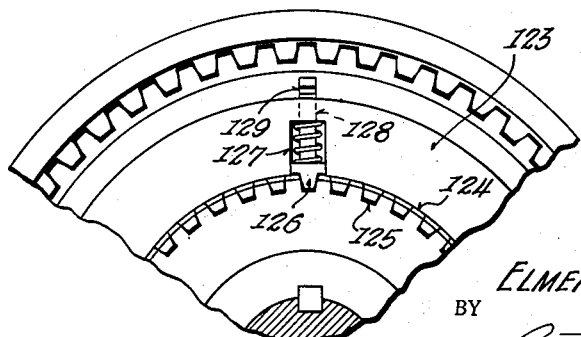
INVENTOR.
ELMER C. KIEKHAEFER
BY
Arthur R. Woolfolk
ATTORNEY.

Patented July 30, 1940

2,209,776

UNITED STATES PATENT OFFICE 2,209,776

MAGNETIC CLUTCH CONSTRUCTION

Elmer C. Kiekhaefer, Grafton, Wis., assignor to Stearns Magnetic Mfg. Co., Milwaukee, Wis., a corporation of Wisconsin Application November 26, 1937, Serial No. 176,505

15 Claims. (Cl. 192—18)

This invention relates to magnetic clutch constructions.

Objects of this invention are to provide a magnetic clutch construction which has only a small flywheel effect, which has a relatively small size for the amount of power delivered, which has an extensive lining area, in which means are provided for taking up wear and may be locked in place without causing the locking means to carry the strain due to the torque transmission, in which the drive is not through any spring construction but is through a rugged portion of the device, and in which a very compact construction is provided.

Further objects are to provide a dual acting device in which a combination of clutch and brake or of two clutches is provided which may be operated either to provide automatic alternate operation or independent operation.

Further objects are to provide a unitary dual acting magnetic device which is particularly directed to the selective operation whereby one set of friction clutch means is mechanically related to the other set of friction clutch means so that when the magnetic means operates one clutch means, for example to close the clutch, the other clutch means is automatically opened, in which the mechanical means for providing this interlocking is a very simple construction, and in which the release is positive and assured and is secured from the movement of the same armature that closes or sets the other friction or clutch means so that the same time constants exist for both devices.

In a further form of this invention objects are to provide a unitary dual magnetic device which may include either the combination of a clutch and brake or of two clutches, in each instance friction clutch means being provided for both devices, in which the friction clutch means are mechancially separate and distinct, and in which they are individually magnetically operated by two separate magnetic means.

Further objects are to provide a construction in which no levers, rock shafts, or other complicated mechanism is employed, but in which very simple and easily produced elements are used, and in which all of the elements are enclosed due to the inherent construction of the device without requiring any auxiliary housing.

Embodiments of the invention are shown in the accompanying drawings, in which:

Figure 1 is a side elevation partly in section of one form of the invention showing the combined clutch and brake.

Figure 2 is a detail fragmentary view on the line 2—2 of Figure 1 showing the locking means for the adjustment for taking up wear.

Figure 3 is a fragmentary view showing a further form of adjustment.

Figure 4 is a view of a further form of the invention showing a combined brake and clutch.

Figure 5 is a sectional view on the line 5—5 of Figure 4 drawn to a smaller scale.

Figure 6 is a further form of the invention showing the construction employed for controlling a two-speed drive.

Figure 7 is a view corresponding to Figure 6 showing a further form for controlling a two-speed drive.

Figure 8 is a view showing a further form of the invention in which a clutch and brake are independently controlled.

Figure 9 is an enlarged fragmentary detail taken on the line 9—9 of Figure 8.

Referring to Figure 1, one form of the invention has been shown in which a dual function magnetic device is employed to control a clutch and brake. In the drawings the driving member is indicated by the reference character 1 and may, if desired, be provided with a flywheel 2. This driving member includes a hub portion 3 having a plurality of teeth 4 similar to gear teeth formed around its periphery. A plurality of friction disks 5 are axially slidably interlocked with the teeth 4. These friction disks 5 may be provided with friction lining or they may be formed of composition if desired.

The driven member includes the shaft 6 between which and the driving member ball bearings 7 and 8 are provided. The bearing 8 may, if desired, be a thrust bearing as indicated. The end of the shaft may be received in the bronze or other bushing 9, though the details of this construction form no portion of this invention.

An intermediate member 10 is keyed on the driven shaft 6 and constitutes the magnetic member. It is provided with an annular recess within which the energizing winding 11 is wound and slip rings 12 may be carried as indicated in Figure 1.

In front of the winding 11 a cover ring 13 may be positioned and may be composed of any suitable material having non-magnetic properties. The intermediate member also includes a portion 14 which is provided with a flange 15 equipped with teeth around its marginal edge and slidably interlocked with the elongated teeth 16 formed internally of the shell 17, the teeth 16 being in the form of internal gear teeth and preferably being entirely around the internal periphery of the shell 17.

One or more intermediate friction disks 18 are provided with external teeth which slidably engage the teeth 16, as indicated in Figure 1, so that the intermediate disk 18 is locked against rotation though axially movable with respect to the shell 17. The shell 17 is provided with a downwardly projecting flange 19 which is positioned outside of the last friction member carried by the driving hub or member 3.

The armature may consist of a ring 20 which is externally screw threaded and screws into the internal threading at the end of the flange 17, as indicated at 21 in Figures 1 and 2.

The armature is provided with one or more slots as shown in Figures 1 and 2 and indicated at 22 within which the T-shaped head 23 of a spring pressed locking plunger 24 is positioned. The plunger 24 extends into an aperture formed in the armature 20 and a spring 25 is positioned in the bottom of such aperture and urges the locking head 23 outwardly. This locking head is adapted to fit into any one of a plurality of notches 26 cut at intervals in the inner periphery of the flange 17, as shown in Figures 1 and 2. Obviously wear may be compensated for, or, in other words, the shell may be adjusted with reference to the armature by pushing the head 23 downwardly and screwing the armature further into the shell, thereafter releasing the head 23 so that it will enter one of the notches 26 and thus lock the armature and shell against relative rotation. The shell 17, however, is slidably interlocked with the flange 15 which is rigid with the driven shaft 6 and consequently the locking means for adjustably locking the armature to the shell does not transmit any of the the driving torque whatsoever.

It is clear that when the magnet is energized, the armature is drawn to the right, as viewed in Figure 1, and moves the shell to the right thereby compressing the friction members and frictionally locking the driven member to the driving member. The two members 10 and 14 constituting the intermediate member are rigidly keyed or otherwise secured to the shaft 6.

A brake construction is provided which is adapted to operate whenever the magnet is deenergized, that is to say, whenever the clutch is opened. This brake construction may comprise a stationary ring 27 which is carried by a suitable support 28 and which is provided with a plurality of internal elongated teeth 29 extending completely around its interior surface.

A plurality of friction rings 30 are keyed to the teeth 29 as indicated in Figure 1. These friction members 30 may be provided with friction linings as shown or may be formed of composition. The driven member is provided with a hub like portion 31 provided with elongated teeth 32 on its outer periphery which are slidably engaged by teeth formed in the friction rings 33, such friction rings 33 alternating with the friction rings 30. An end ring or pressure applying flange or ring 34 is also keyed to the teeth 32, as shown in Figure 1, and is provided with an internally threaded portion which fits the adjustable spring pressed ring 35.

This spring pressed ring is urged to the left, as viewed in Figure 1, by means of a plurality of springs 36 set within recesses in the ring 35 and bearing at their outer ends against an adjusting spring pressure controlling ring 37 threaded upon the intermediate member 10.

It is obvious that wear between the friction rings 30 and 33 may be compensated for by screwing the ring 35 inwardly. The spring pressure exerted upon the ring 35 and consequently the spring pressure acting when the brake is set is controlled by the adjustment of the ring 37. There is no tendency for either of these rings to unscrew when the brake is applied, for the reason that the pressure applying member 34 and the friction rings 33 are keyed to the member 10.

A plurality of rods 38 slidably pass through the member 10 and are positioned between the armature 20 and the ring 35 so that when the armature is pulled to the right, as viewed in Figure 1, when the magnet is energized, it will cause the relief of the friction members forming the brake portion of the device and thus automatically free the driven member from the brake. At the same time the clutch is closed and the driven member is driven from the driving member. When the magnet is deenergized, the springs 36 set the brake.

There is, it will be seen, the mechanical operative connection between the armature actuating the clutch and the brake mechanism so as to insure the release of the brake whenever the clutch is closed, or the setting of the brake whenever the clutch is opened, irrespective of the value of the time constants of the magnetic clutch.

It is obvious that the adjustment for taking up wear may be effected in other ways. For example in the form of the invention shown in Figure 3 the armature is indicated by the reference character 25', the shell 17' corresponding to the shell 17, and the flange 15' corresponding to the flange 15. The shell 17' is threaded into the internally threaded overhanging portion of the armature and is adjusted by screwing the armature further onto the shell as wear occurs, a set screw 39 being provided to lock the armature in place after the adjustment has been made.

The invention may take other forms. For instance as shown in Figure 4, the driving shaft 40 has keyed thereto a driving hub 41 which may be rectangular if desired upon which is slidably fitted the friction member or ring 42, such member having a rectangular aperture slidably fitted on the rectangular hub 41. A stationary member is provided with a flange 43 and with a rectangular hub 44, the sectional view Figure 5 indicating the rectangular construction of the stationary hub 44. The hub 44 slidably carries a plurality of friction disks 45 which are provided with rectangular apertures and slidably fit the rectangular hub 44, as shown in Figures 4 and 5. A shell 46 is rigidly secured to a ring like armature 47 in any suitable manner, as by means of bolts or screws not shown. Removable shims 48 are provided between the shell and the armature to compensate for wear. As wear occurs, the shims are removed.

The shell is provided with diametrically opposed slots 49 within which tongues 50 formed integrally with a cast iron friction ring 51 are slidably received. The friction rings 42 and 45 are preferably made of composition though any suitable material could be used. The shell 46 is provided with another pair of diametrically opposed slots 52 corresponding to the slots 49 within which the tongues 53 of a flange 54 of the driven member are slidably received.

The magnet body portion indicated by the reference character 55 is provided with an annular recess for the energizing winding 56 and with a plurality of recesses for springs 57 which bear against the armature 47, as shown in Figure 1, and thus urge the armature to the right. Slip rings 58 are carried on the left-hand end of the driven member and may be carried by a disk 59 of insulation. Obviously the slip rings could be mounted, as shown in Figure 1 if desired, though mounting them on the end reduces the over-all diameter of the apparatus.

In operation, when the magnet is energized, the armature is drawn to the left in Figure 4 and the friction ring 42 is gripped between a flange 60 integral with the ring 46 and the flange 54, and thus the driven member is frictionally locked to the driving member. When the magnet is deenergized, the springs 57 force the armature to the right, as viewed in Figure 4, and this compresses the friction rings 45 and 51 between the stationary flange 43 and the flange 60 of the shell 46, thus applying the brake.

The invention may include a two-speed drive in which substantially the same principles as heretofore described are employed. For example as shown in Figure 6, the drive shaft 61 loosely carries a relatively large driving drum 62 and a relatively smaller driving drum 63. The drive shaft is rigidly keyed to the magnet body 64 which is provided with the energizing winding 65 and the slip rings 66. The smaller driving drum 63 has rigidly bolted thereto a shell 67 provided with a plurality of internally located teeth 68 with which a plurality of friction rings 69 are slidably interlocked. Cooperating friction rings 70 are interlocked with elongated teeth formed on the magnet body and indicated at 71 so that such disks 70 are also axially slidable.

A compression plate or member 72 in the form of a ring is adapted to compress the friction rings 69 and 70 against the magnet body whenever the magnet is deenergized as will become apparent as the description proceeds. A plurality of bolts or push rods 73 are slidably mounted within the magnet body and are secured to the compression member 72. For example, nuts 74 may be screwed upon the rods 73. It is of course within the province of this invention to thread the rods 73 into the disks 72 and to employ the nuts 74 as lock nuts.

The rods 73 are provided with headed ends 75 which contact with the armature 76 of the magnet. Each rod is provided with a spring 77 positioned within a corresponding socket in the magnet body and urging the member 72 into friction ring compressing position so that when the magnet is deenergized, the springs 77 cause interlocking between the successive friction rings thereby to lock the magnet body 64 and consequently the drive shaft 61 to the drum 63.

The drum 62 is provided with a hub portion 78 which has a plurality of external teeth 79 which slidably interlock with one or more friction disks 80. A shell like member 81 is adjustably secured to the disk armature 76 as by means of the threaded connection 82 and is locked in adjusted position by the spring pressed headed plunger 83 in a manner exactly similar to that described in connection with Figures 1 and 2, a plurality of notches being provided around the internal periphery of the shell 81 corresponding to the notches 26 in Figure 2, into any one of which the spring plunger 83 may be allowed to pass after the necessary adjustment has been made.

The magnet body is rigidly carried by a sleeve like member 84 which is provided with an annular end flange 85 equipped with a plurality of teeth 86 which slidably interlock with the teeth 87 of the shell 81. The shell 81 is provided with a downwardly extending annular flange 88 located outside of the friction ring 80 so that whenever the magnet is energized the armature 76, which is rigid with the shell 81, causes the pressure applying annular ring 88 of the shell 81 to clamp the friction ring 80 between such flange and the flange 85, which flange is rigid with the driving shaft 61, thus operatively coupling the large drum 62 to the drive shaft 61.

The operation of the apparatus is apparent, for when the magnet is not energized, the drive is first from the shaft 61 to the small drum 63. Thereafter when the magnet is energized, the frictional drive connection between the shaft 61 and the drum 63 is released and the drum 62 is operatively coupled to the drive shaft 61. This type of apparatus provides a very smooth change over from a low speed to a high speed drive through the medium of the friction clutches which are alternately operated from a single magnet.

It is apparent that the two friction means could be separately controlled by individual magnet means. For example as shown in Figure 7 such form of the invention is illustrated. In this figure the drive shaft 89 is rigidly keyed to the magnet body or to the shell 90 to which the magnet body proper 91 is rigidly secured in any suitable manner. This magnet is provided with a pair of energizing windings 92 and 93 with each controlled from slip rings so that they may be independently energized and controlled.

A small drum or driven member 94 and a large drum or driven member 95 are revolubly supported from the drive shaft 89. They are respectively rigidly connected to the square flanges 96 and 97 upon which the friction rings 98 and 99, which have squared apertures corresponding to the construction shown in Figure 5, are slidably mounted.

Flanges 100 and 101 are rigid with the magnet body and are each provided with teeth 102 and 103. Preferably these teeth are diametrically arranged and correspond to the teeth 50 of Figure 5. Armatures 104 and 105 are rigidly connected to shells provided with pressure applying flanges 106 and 107, such shells being provided with diametrically opposed slots 108 and 109 into which the teeth 102 and 103 slidably fit, such slots corresponding to the slots 52 of Figure 4.

Normally the armatures 104 and 105 are held outwardly in clutch releasing position by means of a plurality of springs 110 and 111 which are seated within suitable sockets or apertures formed in the magnet body 91. However, when the energizing coil 93, for instance, is supplied with current, the armature 105 is moved to the right as viewed in Figure 7 and thus causes the pressure applying member 107 to bind the friction disk 98 between such flange and the member 101, thus locking the smaller drive drum 94 to the shaft 89.

On the other hand, when it is desired to increase the driving speed, it is obvious that the circuit to this magnet coil may be opened and the energizing coil 92 may be supplied with current, thus drawing the armature 104 to the left as viewed in Figure 7, thereby gripping the friction ring 99 between the flange 106 and the flange 100 and thereby locking the larger driving drum 95 to the drive shaft 89.

It sometimes happens that it is desirable to have both drums 94 and 95 free from connection with the drive shaft 89 and this is readily obtained in this form of the invention by deenergizing both magnets.

Obviously other types of friction means could be employed, as described in connection with other forms of this invention, without departing from the spirit of this invention, and yet the individual magnetic control means can be provided for each friction clutch member, as described in connection with Figure 7.

It is also apparent that one of the driven members can be replaced by a brake means if desired without departing from the spirit of this invention. One form of this construction is shown in Figure 8, in which a brake means is provided on the left-hand side and the driving clutch means on the right-hand side of such figure. In this figure the driven shaft is indicated by the reference character 112 and is rigidly keyed to the sleeve or member 113 which in turn is rigidly secured in any suitable manner to the magnet body 114. This magnet body is provided with two energizing windings 115 and 116 which respectively control the clutch means and the brake means hereinafter described. Slip rings are provided so that individual operation of the magnet means can be secured.

It is obvious that the brake means can be applied either when the magnet controlling such brake means is energized or when it is deenergized. In the form of the invention shown in Figure 8, the brake means is applied whenever the magnet controlling such brake means is deenergized.

The brake means may comprise a stationary ring 117 which is provided with a plurality of internally arranged teeth 118 which slidably receive the teeth of the friction disks 119. The revoluble portion of this brake means comprises a hub 120 rigid with the sleeve 113 and consequently rigid with the driven shaft 112. This hub is provided with a plurality of teeth 121 which slidably receive the friction disks 122. The last or outer friction disk bears against the end plate or collar 123 which is adjustably screwed onto the hub 120 as indicated at 124. The hub 120 is provided with a plurality of notches 125, see Figure 9, into any one of which the head 126 of a spring pressed plunger is adapted to seat, such plunger having its head slidably mounted within a rectangular aperture 127 formed in the bearing plate 123, as shown in Figures 8 and 9. The locking head 126 is rigid with a plunger 128 which is slidable through an aperture in the plate 123 and provided with a notch or slot 129 which may be engaged by a suitable tool to lift the head 126 clear of the notches 125 and allow the end plate 123 to be screwed further inwardly upon the hub to compensate for wear of the friction means.

The right-hand friction disk 122' of the group 122 has teeth slidably interlocking with the teeth 121 in the same manner as the remainder of these disks 122, but it contacts with the outer face of the armature 130. The armature is secured to the friction ring 122' for although there is no driving motion between these parts, nevertheless in starting and stopping there is a tendency for the armature to float or shift with reference to the ring unless it is secured thereto. The armature is forced into brake applying position by means of a plurality of springs 131 seated within sockets formed in the magnet body 114 and normally applies the brake. However, when current is furnished the energizing coil 116, the armature is drawn to the right as viewed in Figure 8 and consequently the magnet body and the driven shaft 112 are released from the brake.

The drive may be through the hub like member 132 which is provided with a plurality of teeth 133 which slidably interlock with the friction rings 134. An armature 135 consists of a ring like member which is threaded into a shell 136 for adjustment to compensate for wear and is provided with a spring pressed locking head 137 corresponding to the locking head 23 of Figures 1 and 2 and fitting within any one of a plurality of notches 138 formed in the inner periphery of the shell 136, such notches corresponding to the notches 26, see Figure 2. This shell 136 is provided with a pressure applying means 139 and is also provided with a plurality of internally located teeth 140 which slidably interlock with the teeth of the friction rings 141.

When the energizing coil 115 is supplied with current, the armature 135 is drawn to the left as viewed in Figure 8 and causes the pressure applying plate 139 to clamp the friction rings between such plate and a disk or pressure plate 142 rigid with the sleeve 113 and consequently rigid with the driven shaft 112, such sleeve being provided with teeth slidably interlocking with the internal teeth 140 of the shell 136.

It is thus possible with this form of the invention to independently control either the clutch brake or else the driving clutch so that the drive may be applied to the driven member or the clutch may be applied to hold the driven member 112 against rotation, or, if desired, the brake may be held off by supplying current to the energizing winding 116.

It sometimes happens in different types of machines controlled from magnet clutch means that it is desirable to have the brake and the drive clutch both open so that the machine may be turned by hand or otherwise adjusted as desired. This is provided by the construction described.

It will be seen that a novel form of dual function magnetic control means has been provided which is very flexible in its application, which may be so made that one clutch means comes into operation simultaneously with the opening of the other clutch means, or which may be so applied that the two clutch means may be independently controlled.

It is also clear that the invention may be applied to a two-speed drive or to a combination of drive and brake without departing from the spirit thereof.

In the different forms of the invention, it is preferable to form the friction disks or friction rings of non-magnetic material. The reason for this is to prevent any stray lines of force from drawing the disks into frictional engagement with each other when the friction disks are not compressed by the action of the armature. While the friction produced through this cause may not be effective to cause driving, nevertheless it would be sufficient to cause a frictional drag that would result in rubbing, wearing and heating, and consequently this invention comprehends the provision of non-magnetic friction members so that these friction members ride loose and free when they are not compressed mechanically by the motion of the armature. This feature of forming the friction members of non-magnetic material is desirable for the reasons pointed out above and is particularly desirable where a dual function magnetic device such as has been disclosed is employed, for where the dual function magnetic device is employed one group of the friction members is released while the other group of friction members is compressed by the operation of the magnetic means. Consequently, as the magnetic means is energized, there is a good chance for stray magnetic lines of force to pass through the non-compressed or inactive friction members.

Although this invention has been described in considerable detail, it is to be understood that such description is intended as illustrative rather than limiting, as the invention may be variously embodied and is to be interpreted as claimed.

I claim:

1. A unitary dual function magnetic device comprising two coaxial spaced members one of which is revolubly mounted, an intermediate member having magnetic means including an armature, said intermediate member being revolubly mounted and coaxial with said spaced members, and coupling means controlled by said magnetic means for mechanically coupling said intermediate member selectively to either of said spaced members, said coupling means including friction means on opposite sides of said intermediate member and outer movable clamping members located outwardly beyond said friction means and operatively connected to said armature.

2. A unitary, self-contained, dual function magnetic device comprising two coaxial spaced members one of which is revolubly mounted, an intermediate member having magnetic means including at least one magnet and at least one armature, said intermediate member being coaxial with said spaced members and adapted to be coupled to one or the other of said spaced members, coupling means including friction means associated with each of said spaced members and with said intermediate member for mechanically connecting said intermediate member to said spaced members and located on opposite sides of said intermediate member, said coupling means having movable outer clamping means located outwardly beyond said friction means, said magnetic means selectively controlling the operation of said friction means by selectively moving said outer clamping means, whereby said intermediate member may be selectively operatively coupled to said spaced members.

3. A unitary dual function magnetic device comprising two coaxial spaced members one of which is revolubly mounted, an intermediate member having magnetic means including a magnet and an armature, said intermediate member being coaxial with said spaced members and adapted to be coupled to one or the other of said spaced members, coupling means including friction means associated with each of said members and with said intermediate member for mechanically connecting said intermediate member to said spaced members and located on opposite sides of said intermediate member, said coupling means having movable outer clamping means located outwardly beyond said friction means, said armature being operatively connected to one of said clamping means to cause the corresponding friction means to operatively connect said intermediate member with one of said members and being operatively connected to the other of said clamping means to cause the corresponding friction means to disconnect said intermediate member from the other of said spaced members.

4. A unitary, self-contained, dual function magnetic device comprising two coaxial spaced members one of which is revolubly mounted, an intermediate member having two distinct magnetic means, said intermediate member being revolubly mounted and coaxial with said spaced members, and coupling means for each of said spaced members controlled respectively by the magnetic means carried by said intermediate member and adapted to be independently operated for mechanically coupling said intermediate member selectively to either of said spaced members, said coupling means each being a self-contained system having only internal stresses when said magnetic means is energized, whereby no force is imparted axially to either of said two coaxial spaced members.

5. A unitary dual function magnetic device comprising two coaxial spaced members one of which is revolubly mounted and the other of which is stationary, an intermediate member having magnetic means including a magnet and an armature, said intermediate member being coaxial with said spaced members and adapted to be coupled to one or the other of said spaced members, coupling means including friction means associated with each of said members and with said intermediate member for mechanically connecting said intermediate member to said spaced members and located on opposite sides of said intermediate member, said coupling means having movable outer clamping means located outwardly beyond said friction means, said armature being operatively connected to one of said friction means to cause said friction means to operatively connect said intermediate member with one of said spaced members and being operatively connected to the other of said friction means to cause said other friction means to disconnect said intermediate member from the other of said spaced members.

6. A unitary dual function device comprising two coaxial spaced members one of which is revolubly mounted, a third member having power means, said third member being revolubly mounted and coaxial with said spaced members, and coupling means controlled by said power means for coupling said third member selectively to either of said spaced members, said coupling means including friction means located on opposite sides of said intermediate member and movable clamping means located outwardly beyond said friction means and operatively coupled to said power means.

7. A magnetic clutch comprising a driving member and a driven member, one of said members having a magnet body formed thereon, an energizing winding carried by said magnet body, an armature cooperating with said magnet body, friction means compressed by said armature when said armature is drawn towards said magnet body for operatively connecting said driving and driven members, a stationary member, friction means carried by said stationary member, friction means carried by said magnet body, a pressure applying member spring pressed to force the last mentioned friction means into engagement with the friction means carried by said stationary member and located outwardly beyond both of said last mentioned friction means, and means for transmitting motion from said armature to said pressure applying member when said magnet is energized to displace said pressure applying member.

8. A magnetic clutch comprising a driving member and a driven member, said driven member having a magnet body formed thereon, an energizing winding carried by said magnet body, an armature cooperating with said magnet body, friction means compressed by said armature when said armature is drawn towards said magnet body for operatively connecting said driving and driven members, a stationary ring surrounding a portion of said driven member, friction means carried by said ring, friction means carried by said driven member, a pressure applying member spring pressed to force said last mentioned friction means into engagement with the friction means carried by said stationary ring and located outwardly beyond both of said last mentioned friction means, and means for transmitting motion from said armature to said pressure applying member when said magnet is energized to displace said pressure applying member.

9. A magnetic clutch comprising a driving member and a driven member, one of said members having a magnet body formed thereon, an energizing winding carried by said magnet body, a ring like armature cooperating with said magnet body and movable with respect to said magnet body, the member with said magnet body having a flange forming a rigid part thereof and having a shell like portion slidably interlocked with said flange against relative rotation and having axial motion with respect to said flange, said shell like portion having an inwardly projecting flange and being connected to said armature, the other of said members having a hub like portion, friction means carried between the two said flanges and connected respectively with said driving and driven members, at least one unit of the friction means being slidably interlocked with the corresponding member, an inwardly spring pressed ring slidably carried by the member with the magnet body, means for transmitting motion from said armature to said spring pressed ring to move said ring outwardly when said magnet is energized, a pressure applying member secured to said ring and slidably interlocked with the member with the magnet body, a stationary member, and friction means carried respectively by the member with said magnet body and said stationary member and adapted to be compressed by said pressure applying member when said magnet is deenergized.

10. A magnetic clutch comprising a driving member and a driven member, one of said members having a magnet body formed thereon, an energizing winding carried by said magnet body, a ring like armature cooperating with said magnet body and movable with respect to said magnet body, the member with said magnet body having a flange forming a rigid part thereof and having a shell like portion slidably interlocked with said flange against relative rotation and having axial motion with respect to said flange, said shell like portion having an inwardly projecting flange and being adjustably connected to said armature, the other of said members having a hub like portion, friction means carried between the two said flanges and connected respectively with said driving and driven members, at least one unit of the friction means being slidably interlocked with the corresponding member, an inwardly spring pressed ring slidably carried by the member with the magnet body, means for transmitting motion from said armature to said spring pressed ring to move said ring outwardly when said magnet is energized, a pressure applying member secured to said ring and slidably interlocked with the member with the magnet body, a stationary member, and friction means carried respectively by the member with said magnet body and said stationary member and adapted to be compressed by said pressure applying member when said magnet is deenergized.

11. A magnetic clutch comprising a driving member and a driven member, one of said members having a magnet body formed thereon, an energizing winding carried by said magnet body, a ring like armature cooperating with said magnet body and movable with respect to said magnet body, the member with said magnet body having a flange forming a rigid part thereof and having a shell like portion slidably interlocked with said flange against relative rotation and having axial motion with respect to said flange, said shell like portion having an inwardly projecting flange and being connected to said armature, the other of said members having a hub like portion, friction means carried between the two said flanges and connected respectively with said driving and driven members, at least one unit of the friction means being slidably interlocked with the corresponding member, an inwardly spring pressed ring slidably carried by the member with the magnet body, means for transmitting motion from said armature to said spring pressed ring to move said ring outwardly when said magnet is energized, a pressure applying member secured to said ring and slidably interlocked with the member with the magnet body, a stationary member, and friction means carried respectively by the member with said magnet body and said stationary member and adapted to be compressed by said pressure applying member when said magnet is deenergized, at least one unit of said friction means being slidable with respect to one of said last mentioned members.

12. A magnetic clutch comprising a driving member and a driven member, one of said members having a magnet body formed thereon, an energizing winding carried by said magnet body, a ring like armature cooperating with said magnet body and movable with respect to said magnet body, the member with said magnet body having a flange forming a rigid part thereof and having a shell like portion slidably interlocked with said flange against relative rotation and having axial motion with respect to said flange, said shell like portion having an inwardly projecting flange and being connected to said armature, the other of said members having a hub like portion, friction means carried between the two said flanges and connected respectively with said driving and driven members, at least one unit of the friction means being slidably interlocked with the corresponding member, an inwardly spring pressed ring slidably carried by the member with the magnet body, means for transmitting motion from said armature to said spring pressed ring to move said ring outwardly when said magnet is energized, a pressure applying member adjustably secured to said ring and slidably interlocked with the member with the magnet body, a stationary member, and friction means carried respectively by the member with said magnet body and said stationary member and adapted to be compressed by said pressure applying member when said magnet is deenergized, at least one unit of said friction means being slidable with respect to one of said last mentioned members.

13. A magnetic clutch comprising a driving member and a driven member, one of said members having a magnet body formed thereon, an energizing winding carried by said magnet body, a ring like armature cooperating with said magnet body and movable with respect to said magnet body, the member with said magnet body having a flange forming a rigid part thereof and having a shell like portion slidably interlocked with said flange against relative rotation and having axial motion with respect to said flange, said shell like portion having an inwardly projecting flange and being connected to said armature, the other of said members having a hub like portion, friction means carried between the two said flanges and connected respectively with said driving and driven members, at least one unit of the friction means being slidably interlocked with the corresponding member, an inwardly spring pressed ring slidably carried by the member with the magnet body, means for transmitting motion from said armature to said spring pressed ring to move said ring outwardly when said magnet is energized, a pressure applying member secured to said ring and slidably interlocked with the member with the magnet body, a stationary member, friction means carried respectively by the member with said magnet body and said stationary member and adapted to be compressed by said pressure applying member when said magnet is deenergized, at least one unit of said friction means being slidable with respect to one of said last mentioned members, and means for varying the spring pressure exerted on said spring pressed ring.

14. A magnetic clutch construction comprising a driven member, a driving member located on one side of said driven member, a stationary member located on the other side of said driven member, friction clutch means between said driven member and said driving and stationary members, and independent magnetic means, said magnetic means controlling the operation of said friction clutch means, said magnetic clutch construction constituting a unitary structure, said independent magnetic means including independent magnets and armatures and movable pressure applying means located outwardly beyond said friction clutch means and operatively connected to the corresponding armature.

15. A unitary dual function magnetic device comprising two coaxial spaced members one of which is revolubly mounted, a third member having magnetic means, said third member being revolubly mounted and coaxial with said spaced members, a plurality of nonmagnetic friction members carried by said spaced members and said third member, armature means controlled by said magnetic means and carried by said third member, and pressure applying movable means actuated from said armature and located outwardly beyond said friction members for selectively coupling said third member to either of said spaced members by compression of said friction members.

ELMER C. KIEKHAEFER.